(12) United States Patent
Lacoste

(10) Patent No.: US 11,493,207 B2
(45) Date of Patent: Nov. 8, 2022

(54) AUTO-DRIVEN PLASMA ACTUATOR FOR TRANSITION FROM DEFLAGRATION TO DETONATION COMBUSTION REGIME AND METHOD

(71) Applicant: KING ABDULLAH UNIVERSITY OF SCIENCE AND TECHNOLOGY, Thuwal (SA)

(72) Inventor: Deanna A. Lacoste, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 97 days.

(21) Appl. No.: 16/497,979

(22) PCT Filed: Mar. 15, 2018

(86) PCT No.: PCT/IB2018/051753
§ 371 (c)(1),
(2) Date: Sep. 26, 2019

(87) PCT Pub. No.: WO2018/203153
PCT Pub. Date: Nov. 8, 2018

(65) Prior Publication Data
US 2020/0378605 A1 Dec. 3, 2020

Related U.S. Application Data

(60) Provisional application No. 62/492,210, filed on Apr. 30, 2017.

(51) Int. Cl.
*F23R 7/00* (2006.01)
*F02C 5/00* (2006.01)
*H05H 1/52* (2006.01)

(52) U.S. Cl.
CPC .................. *F23R 7/00* (2013.01); *F02C 5/00* (2013.01); *H05H 1/52* (2013.01)

(58) Field of Classification Search
CPC ...... F23R 7/00; F23R 2900/00009; F02C 5/00
See application file for complete search history.

(56) References Cited

U.S. PATENT DOCUMENTS

| 4,510,748 A * | 4/1985 | Adams | F02K 7/02 60/39.76 |
| 7,047,724 B2 * | 5/2006 | Nordeen | F02C 3/16 60/226.1 |

(Continued)

FOREIGN PATENT DOCUMENTS

| EP | 2480771 A1 | 8/2012 |
| EP | 2600061 A2 | 6/2013 |

(Continued)

OTHER PUBLICATIONS

Poehlmann et all. "The Deflagration—Detonation Transition in Gas-Fed Pulsed Plasma Accelerators" AIAA 2007-5263, 43rd AIAA/ASME/SAE/ASEE Joint Propulsion Conference & Exhibit Jul. 8-11, 2007, Cincinnati, OH, pp. 1-11. (Year: 2007).*

(Continued)

*Primary Examiner* — Ted Kim
(74) *Attorney, Agent, or Firm* — Patent Portfolio Builders PLLC

(57) ABSTRACT

An engine that uses detonation for generating energy includes a housing; an inlet configured to inject a fuel mixture into an ignition region of the housing, the inlet being attached to the housing; an ignitor located in the ignition region and configured to ignite the fuel mixture; a deflagration to detonation, DDT, region in fluid communication and downstream from the ignition region; a pair of electrodes located in the DDT region and configured to apply nanosecond repetitive voltage pulses to the DDT region; and a detonation region, within the housing, in fluid communication and downstream from the DDT region. The nanosecond repetitive voltage pulses generate a non-thermal plasma that transition a combustion front propagation through the housing from a deflagration mode to a detonation mode.

15 Claims, 14 Drawing Sheets

(56) References Cited

U.S. PATENT DOCUMENTS

| | | | | |
|---|---|---|---|---|
| 2012/0151898 A1* | 6/2012 | Claflin | ............... | F23R 7/00 60/204 |
| 2013/0025256 A1 | 1/2013 | Lu et al. | | |
| 2013/0139487 A1* | 6/2013 | Kenyon | ............... | F02C 5/00 60/39.76 |
| 2020/0063967 A1* | 2/2020 | Leyko | ............... | F23R 7/00 |

FOREIGN PATENT DOCUMENTS

| | | |
|---|---|---|
| WO | 2011037597 A1 | 3/2011 |
| WO | 2012092285 A1 | 7/2012 |

OTHER PUBLICATIONS

International Search Report in corresponding/related International Application No. PCT/IB2018/051753, dated Jun. 13, 2018.

Lefkowiiz, J.K., et al., "Schlieren Imaging and Pulsed Detonation Engine Testing of Ignition by a Nanosecond Repetitively Pulsed Discharge," Combusion and Flame, Mar. 17, 2015, vol. 162, pp. 2496-2507, Elsevier Inc.

Pilla, G., et al., "Stabilization of a Turbulent Premixed Flame Using a Nanosecond Repetitively Pulsed Plasma," IEEE Transactions on Plasma Science, Jan. 2007, vol. 34, No. 6, 7 pages.

Starikovskiy, A., et al., "Plasma-Assisted Ignition and Deflagration-to-Detonation Transition," Philosophical Transactions of The Royal Society, Feb. 13, 2012, vol. 370, pp. 740-773, The Royal Society.

Written Opinion of the International Searching Authority in corresponding/related International Application No. PCT/IB2018/051753, dated Jun. 13, 2018.

Yin, Z., et al., "Ignition Time Measurements in Repetitive Nanosecond Pulse Hydrogen-Air Plasmas at Elevated Initial Temperatures," IEEE Transactions on Plasma Science, Dec. 2011, vol. 39, No. 12.

Zheng, D., "The Advantages of Non-Thermal Plasma for Detonation Initiation Compared with Spark Plug," Plasma Science and Technology, Feb. 2016, vol. 18, No. 2, pp. 162-167.

Lacoste, D.A. et al., "Effect of Nanosecond Repetitively Pulsed Discharges on the Dynamics of a Swirl-Stabilized Lean Premixed Flame," Journal of Engineering for Gas Turbines and Power, Oct. 2013, vol. 135, pp. 101501-1-101501-7.

Pilla, G. L. et al., "Stabilization of a Swirled Propane-Air Flame Using a Nanosecond Repetitvely Pulsed Plasma," IEEE Transactions on Plasma Science, Aug. 2008, vol. 36, No. 4, pp. 940-941.

\* cited by examiner

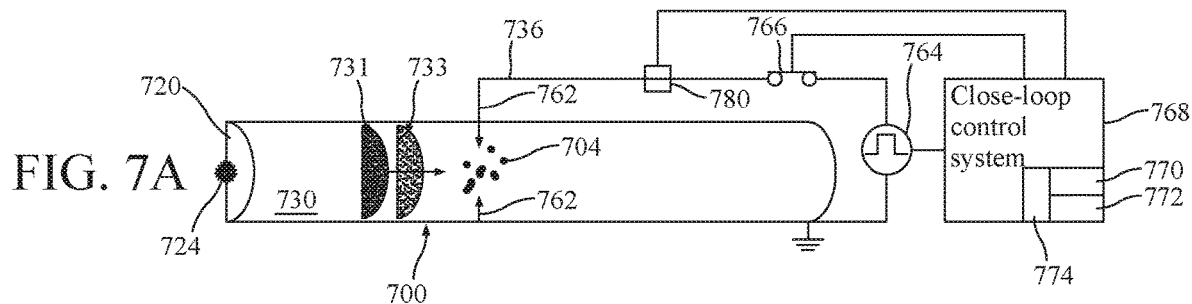
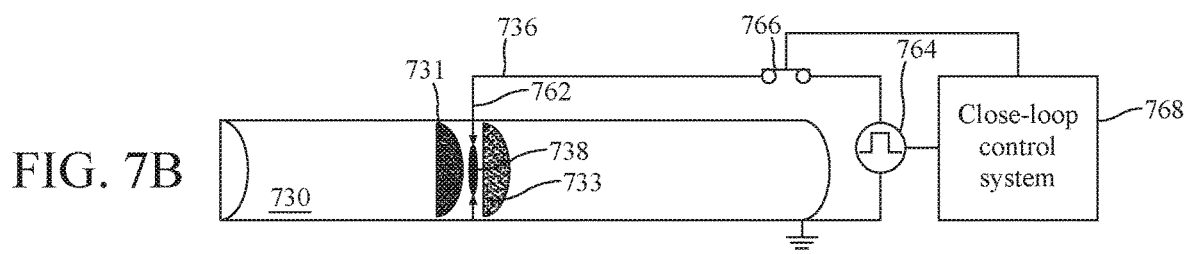
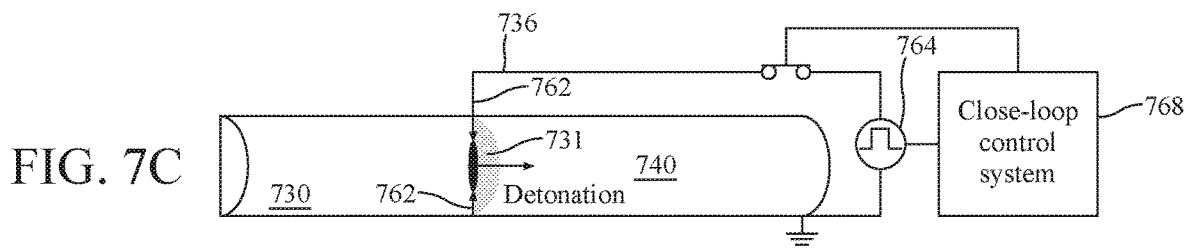
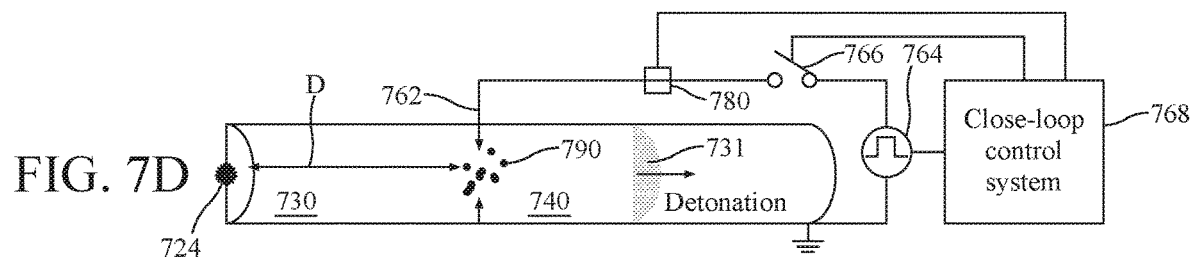

AUTO-DRIVEN PLASMA ACTUATOR FOR TRANSITION FROM DEFLAGRATION TO DETONATION COMBUSTION REGIME AND METHOD

CROSS REFERENCE TO RELATED APPLICATIONS

This application is a U.S. National Stage Application of International Application No. PCT/IB2018/051753, filed Mar. 15, 2018, which claims priority and benefit from U.S. Provisional Patent Application No. 62/492,210, filed on Apr. 30, 2017, for "Auto driven Plasma Actuator for Transition from Deflagration to Detonation Combustion Regime," the contents of which are incorporated in their entirety herein by reference.

BACKGROUND

Technical Field

Embodiments of the subject matter disclosed herein generally relate to the detonation regime of combustion in an engine, and more specifically, to methods and systems for accelerating a transition from deflagration to detonation in such engines.

Discussion of the Background

Compared to classical constant volume or constant pressure thermodynamic cycles, used for example, in the car engines, the detonation regime of combustion could increase the efficiency of engines by 40%. One of the main challenges in this field is to achieve a self-sustained detonation for practical fuel-oxidizer mixtures (e.g. kerosene-air), in a setup with typical dimensions comparable to those of the combustion chamber of a commercial gas turbine.

A very simplified schematic of a gas turbine 100 is illustrated in FIG. 1. Gas turbine 100 may have various regions where different processes are taking place. In region 102, air 104 is input at port 106. Optionally, the air 104 is compressed with a compressor 108 (e.g., turbine) and supplied to mixing region 110. Note that the dash lines between the various regions indicate an approximate border of each region and in reality, these lines do not correspond to physical walls inside the gas turbine. In other words, the dash lines are simply aids for visualizing the extent of a certain process inside the gas turbine.

Fuel 112 (hydrogen based fuel or any other fuel that can support a detonation process) is inserted at port 114 into mixing region 110 and the fuel and air get mixed together. Although FIG. 1 shows no aid in the mixing process, it is known to use various devices for improving the mixing process. The fuel mixture 122 enters the ignition region 120, where an ignitor 124 ignites the mix.

At this point in time, the fuel mixture undermines a deflagration process and enters into the deflagration to detonation transition region (DDT) 130. Depending on the configuration of the engine, the fuel mixture, the pressure and temperature, and other conditions, the deflagration can be transformed into a detonation in the detonation region 140. In this region, the detonation waves propagate at speeds above the speed of sound. The combustion products 142 enter at high speed into the energy producing region 150, where, for example, a turbine 152 may be installed. The high speed combustion products 142 would actuate (e.g., rotate) the turbine 152 with high speed, thus generating energy.

Although progress has been made to shorten the ignition time of the fuel mixture and to stabilize the flame, one remaining problem with such engines is achieving a self-sustained detonation for practical fuel-oxidizer mixtures and also reducing the length of the DDT region 130.

Accordingly, it is desirable to develop an improved engine for which the DDT region's length is reduced.

SUMMARY

According to another embodiment, there is an engine that uses detonation for generating energy and the engine includes a housing; an inlet configured to inject a fuel mixture into an ignition region of the housing, the inlet being attached to the housing; an ignitor located in the ignition region and configured to ignite the fuel mixture; a deflagration to detonation, DDT, region in fluid communication and downstream from the ignition region; a pair of electrodes located in the DDT region and configured to apply nanosecond repetitive voltage pulses to the DDT region; and a detonation region, within the housing, in fluid communication and downstream from the DDT region. The nanosecond repetitive voltage pulses generate a non-thermal plasma that transition a combustion front propagation through the housing from a deflagration mode to a detonation mode.

According to another embodiment, there is a method for driving an engine that uses detonation for generating energy. The method includes injecting a fuel mixture at an inlet, into an ignition region of a housing; igniting the fuel mixture with an ignitor located in the ignition region; applying nanosecond repetitive voltage pulses with a pair of electrodes located in a deflagration to detonation, DDT, region, which is in fluid communication and downstream from the ignition region; and initiating a detonation of a combustion front in a detonation region, within the housing, which is in fluid communication and downstream from the DDT region. The nanosecond repetitive voltage pulses generate a non-thermal plasma that initiate a transition of the combustion front propagation through the housing from a deflagration mode to a detonation mode.

According to still another embodiment, there is an auto-driven plasma actuator control system that includes a pulser configured to generate nanosecond repetitive voltage pulses; a pair of electrodes to be located in a deflagration to detonation, DDT, region of an engine, and configured to apply nanosecond repetitive voltage pulses to the DDT region; and a control system configured to control the pulser and the pair of electrodes. The control system turns on the pair of electrodes before a combustion front of the engine arrives at a location of the pair of electrodes and turns the pair of electrodes off after the combustion front has passed. The nanosecond repetitive voltage pulses generate a non-thermal plasma that transition the combustion front propagation through the engine from a deflagration mode to a detonation mode.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 7A-7D illustrate a control system that controls the turning on and off of the NRP energy applied to the engine;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a detonation tube that uses a fuel mixture of $H_2$-air. However, similar embodiments and methods may be used for any detonation engine or fuel mixtures. Note that in the following, the term "engine" is understood to mean a detonation engine, a rotating detonation engine and/or a pressure-gain combustor.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
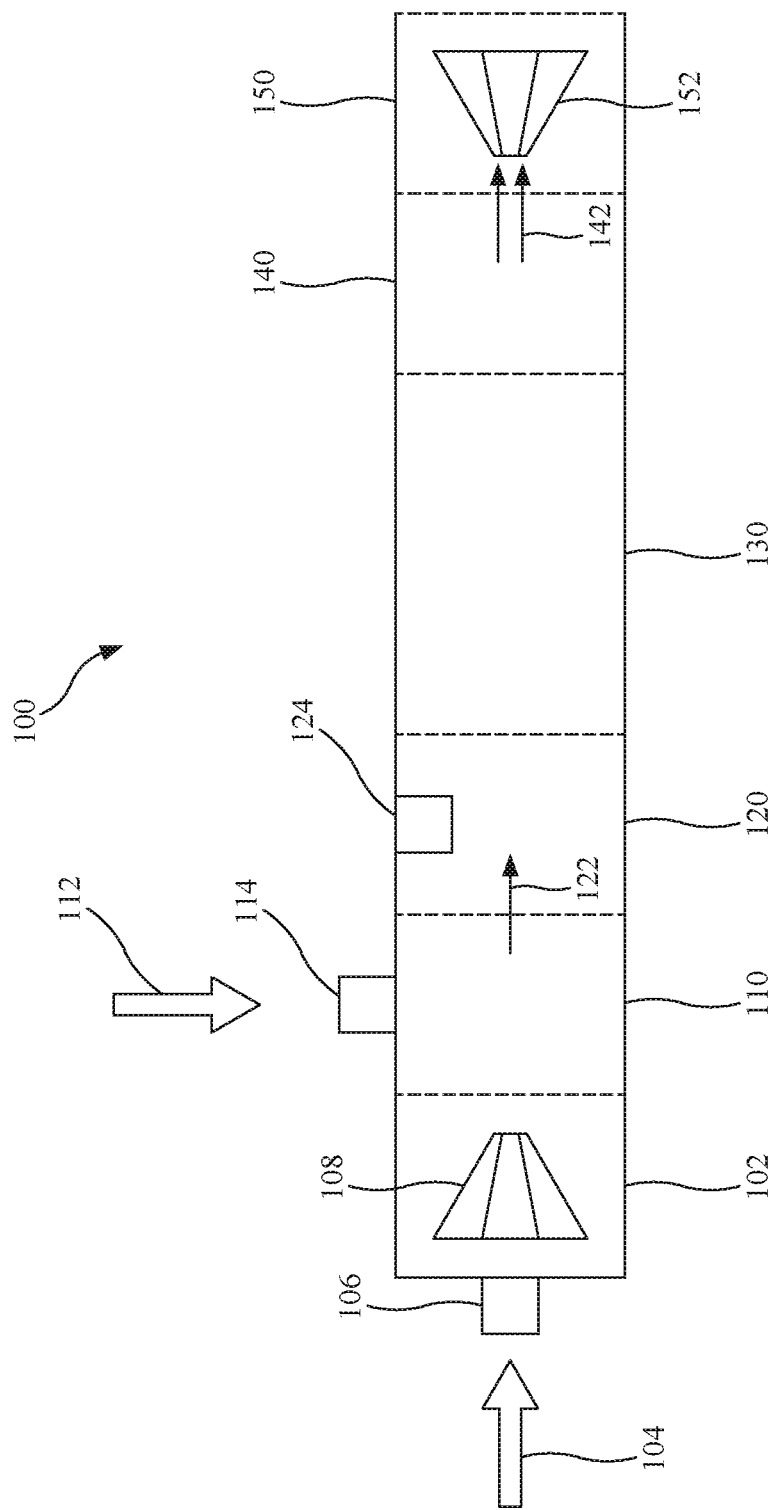
FIG. 1 illustrates a gas turbine.

In the past, nanosecond repetitively pulsed (NRP) discharges have shown promising ability for combustion enhancement and ignition. For example, NRP discharges have been successfully used to decrease (1) the ignition delay time (Yin et al., 2011) in the ignition region 120 of FIG. 1 and (2) the lean flammability limits of gaseous mixtures (Pilla et al., 2006; 2008). They were also successfully applied for the control of flame dynamics (Lacoste et al., 2013) and the ignition of a detonable mixture (Lefkowitz et al., 2015).

Figure 2:
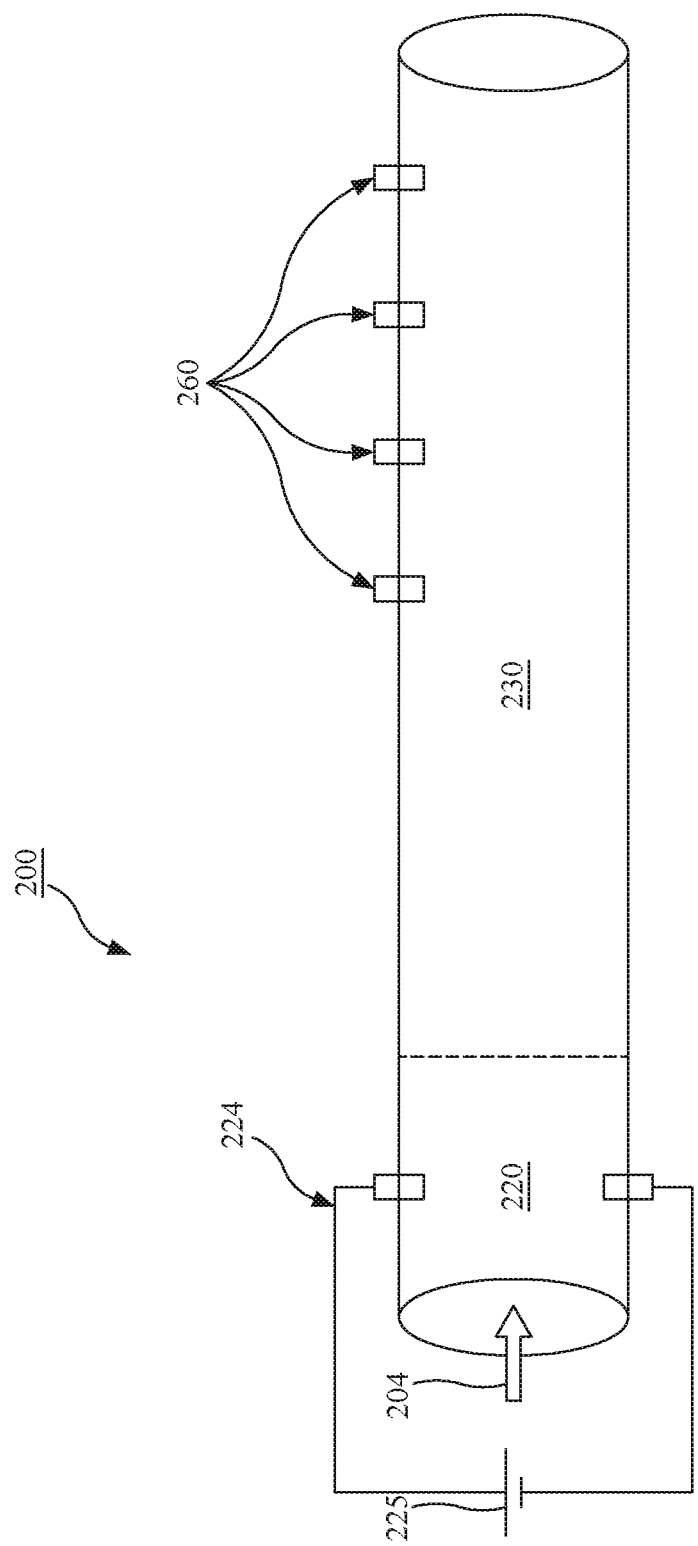
FIG. 2 illustrates an experimental setup for measuring a deflagration to detonation region.

However, in this document, a new application of a non-equilibrium plasma generated with NRP discharges is implemented in an engine to decrease the DDT distance. Experiments have been conducted at atmospheric conditions in a closed tube 200 of 3.5 m length and 38 mm inlet diameter as illustrated in FIG. 2. The DDT of stoichiometric hydrogen-air mixture 204 has been investigated with the help of high-speed piezoelectric pressure transducers 260. Eight piezoelectric sensors 260 (only four are shown for simplicity) located every 270 mm, starting from 1.35 m away from the ignition region 220, were used to record the propagation of the pressure wave produced by the combustion. The ignition source 224 is an electrical spark of 50 mJ, produced with a commercial spark plug attached to a high-voltage supply 225. This ignition source is located at one end of the tube. In this 3.5 m straight tube 200, without any enhancement, the DDT does not occur. This means, that detonation region 240 is not present inside tube 200. Air and fuel inlets, compression and gas mixtures are not specified in this embodiment and can be of different nature than presented above. Similarly, the method to generate mechanical work from burnt gases can be different from the traditional arrangement of a commercial gas turbine.

Figure 3:
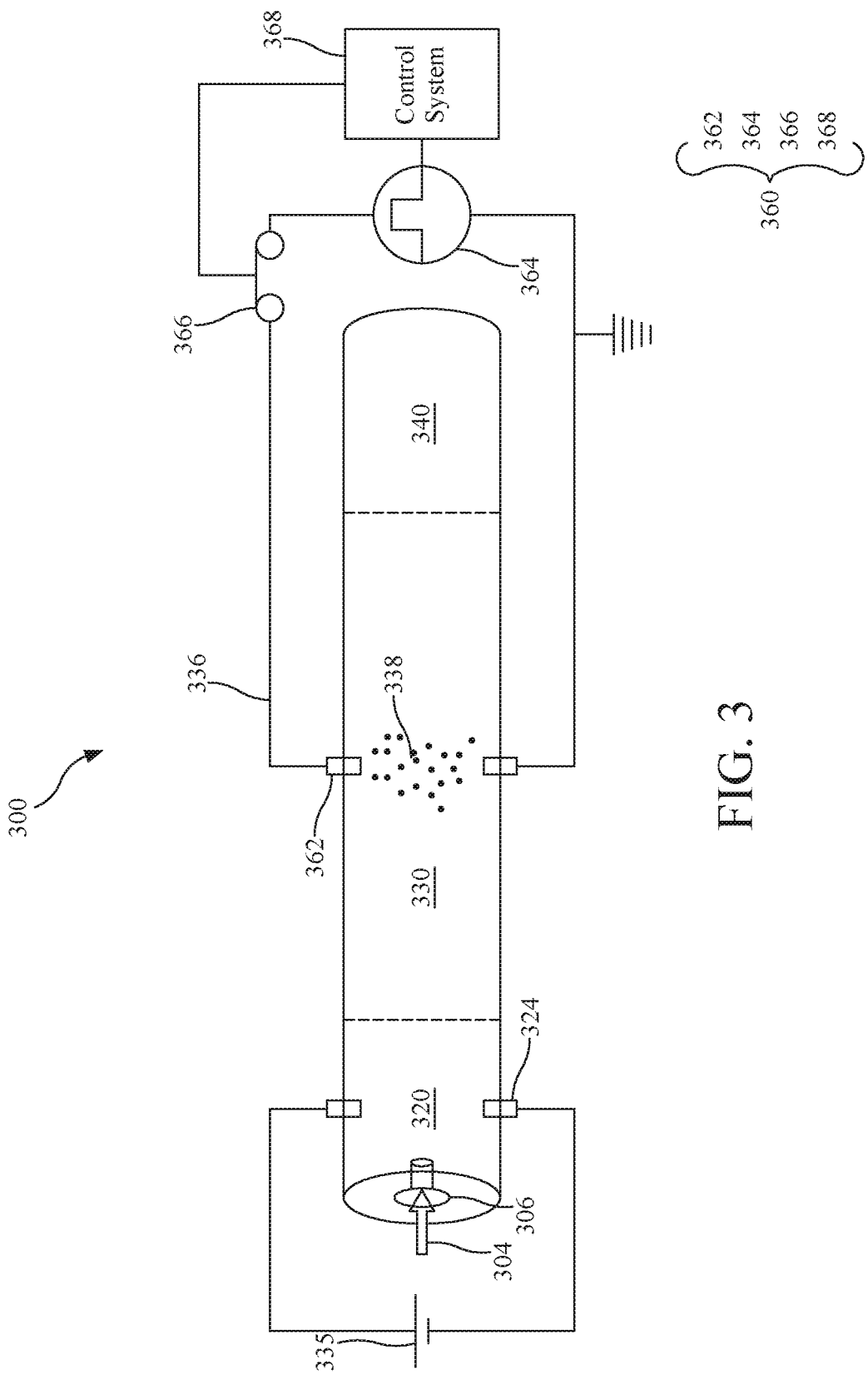
FIG. 3 illustrates an engine that uses nanosecond repetitive pulses for applying energy to a combustion front.
Figure 4:
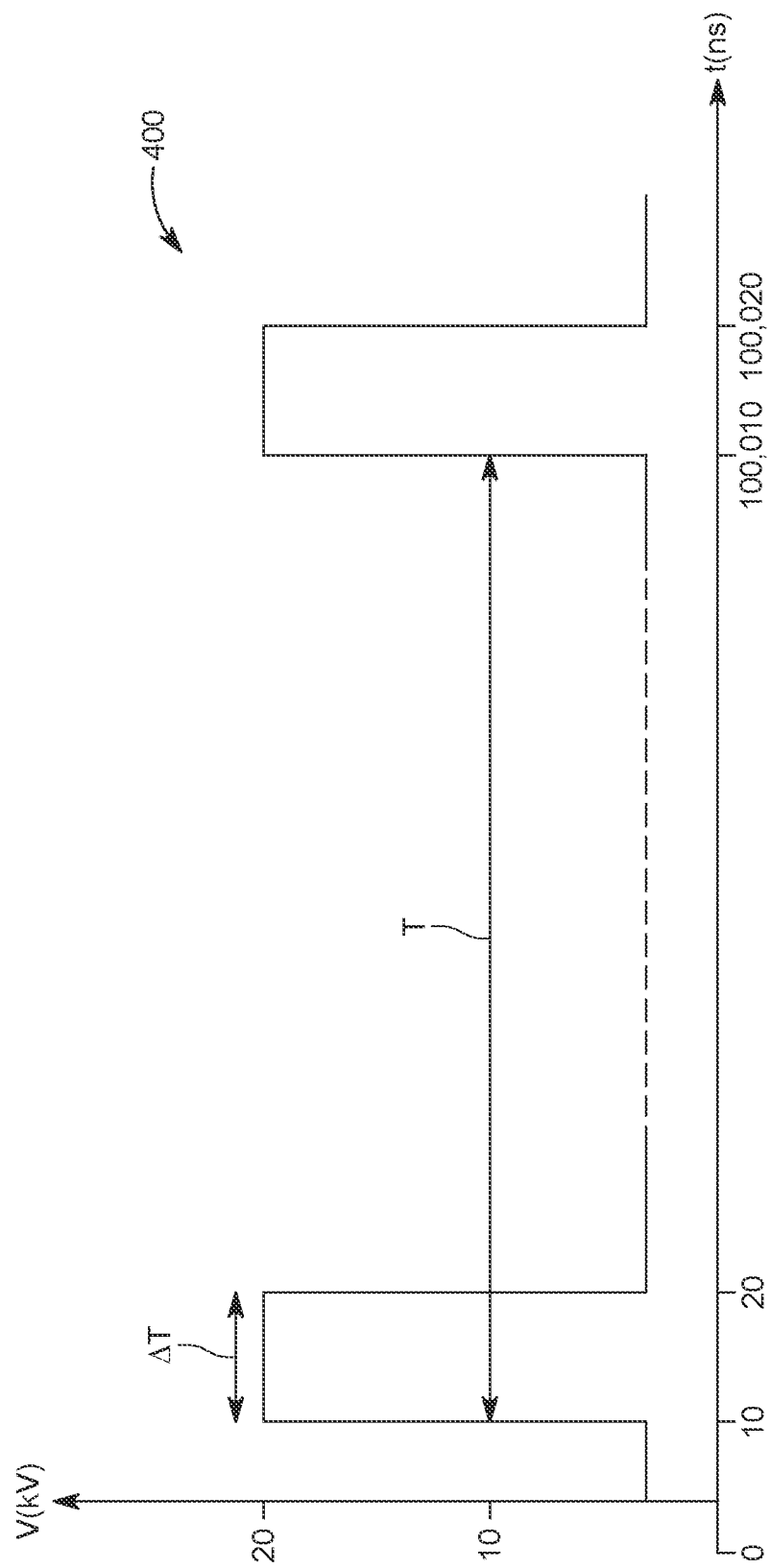
FIG. 4 illustrates nanosecond repetitive pulses.

In this context, according to an embodiment illustrated in FIG. 3, in order to create the DDT region 330 and the detonation region 340 in a tube (housing) 300, and also to accelerate the DDT process, a non-thermal plasma discharge is added in the DDT region. A non-thermal plasma is in general any plasma which is not in thermodynamic equilibrium, either because the gas temperature is different from the electron temperature, or because the vibrational and/or rotational distribution of one of the species does not follow a Maxwell-Boltzmann distribution. FIG. 3 shows a pair of electrodes 362 attached to tube 300 and connected to a pulser 364, which is a source of high-voltage that applies pulses of high voltages 336 having a certain length and a certain frequency repetition. These high-voltage pulses lasting for nanoseconds are called herein an NRP voltage. FIG. 4 shows a voltage pulse 400 applied by pulser 364. Voltage pulse 400 lasts for a time Δt, e.g., 10 ns, and is repeated every T microseconds, for example, T=100 μs (or with a repetition rate of 10 kHz). Other values for Δt in the nanosecond range and for T in the microsends range are possible. FIG. 3 also show a switch 366 and a control system 368 which are configured to control the applied NRP voltage. Electrodes 362, pulser 364, switch 366 and control system 368 form the NRP system 360, which is discussed later in more detail.

By applying the high-voltage 336 generated by pulser 364 in the DDT region 330, a non-thermal plasma 338 in generated between electrodes 362 under specific conditions which are discussed later. The energy associated with this plasma is deposited into the fuel mixture 304 and thus, it can generate the detonation of the fuel and also it can decrease the time for the DDT process. FIG. 3 shows an input 306 that provides the fuel mixture 304 to the ignition region 320. However, certain conditions need to be met for the non-thermal plasma 338 in order to generate the detonation and reduced the DDT process time. These conditions are now discussed.

Figure 5:
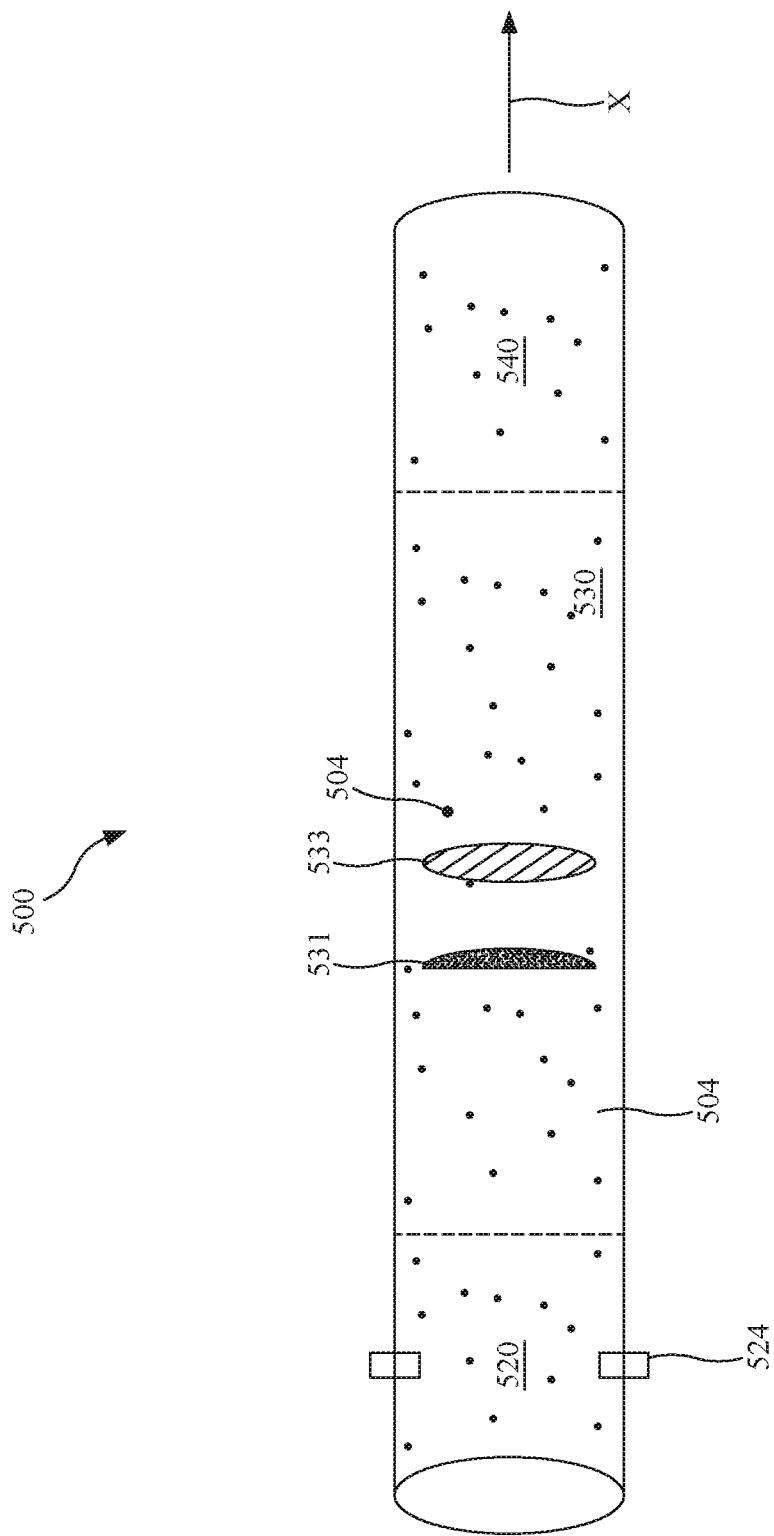
FIG. 5 illustrates the combustion front and a pressure wave.

In a simplified way, after the fuel mixture is ignited, a flame front or combustion front is generated and this front propagates inside the tube as long as there is fuel mixture to maintain the flame. With regard to FIG. 5, the fuel mixture 504 is present everywhere inside the tube 500, i.e., in the ignition region 520, DDT region 530 and detonation region 540. After the ignition has been achieved in the ignition region 520, with the help of ignitor 524, a flame has been created and this flame propagates from the ignition region 520 to the DDT region 530. FIG. 5 shows a combustion front 531 (the front of the propagating flame) that propagates along a longitudinal direction X of the tube 500.

A deflagration can be defined as the combustion (or flame) front propagating in a fuel mixture, mainly due to burnt gases expansion. During a deflagration process, the combustion front 531 propagates with a certain speed, typically below 100 m/s. In confined environments, as in the tube 500 of FIG. 5, a pressure wave 533 develops ahead of the combustion front 531, which preheats the fuel mixture 504. This leads to acceleration of the combustion front 531, increasing the intensity of the pressure wave.

A deflagration turns into a detonation when the pressure wave 533 (unburnt gas ahead of the combustion front) becomes a shock wave, i.e., it is characterized by supersonic flame propagation velocities. A typical velocity for a shock wave is up to 2,000 m/s. A shock wave behind which conditions of auto-ignition are reached (i.e., temperatures due to the shock wave are high enough to ignite the fuel mix) becomes a self-driven detonation wave and this is desired to be achieved inside tube 500. Thus, a detonation can be defined as the self-sustained propagation of a shock wave 533 followed by a combustion front 531 of auto-ignited combustion.

According to the embodiment illustrated in FIG. 5, the energy from the NRP voltage (i.e., the plasma energy) is used to accelerate the onset of a detonation by injecting the energy (i) between the pressure wave 533 and the propagating combustion front 531 and/or (ii) in the turbulent combustion front 531 itself. This is achieved with the help of nanosecond plasma discharges applied at high-frequency. Thus, the non-thermal plasma generated by the NRP voltage is used to assist the pressure wave 533 to reach conditions of auto-ignition and to obtain a self-sustained detonation.

Figure 6A:
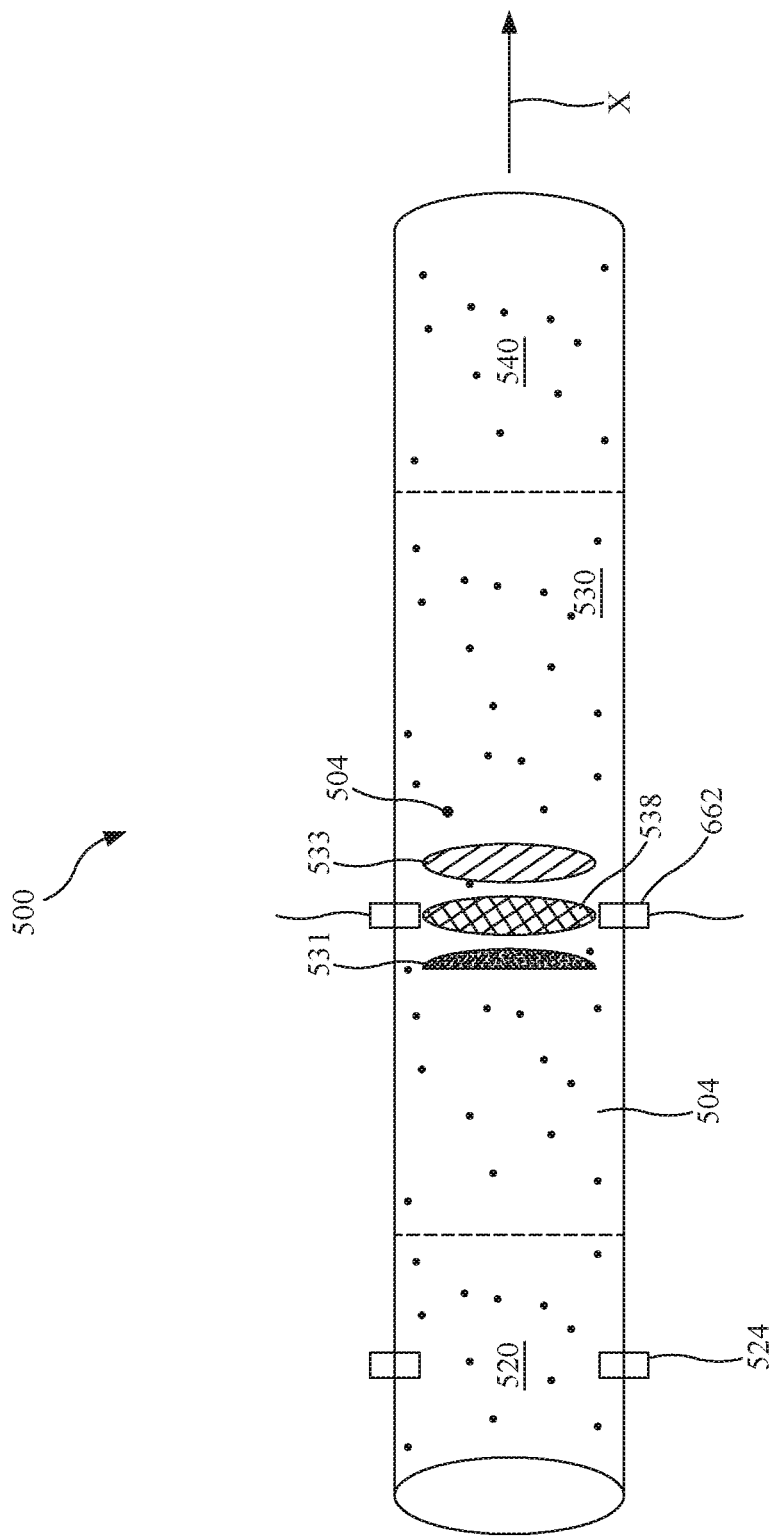
FIG. 6A illustrates an engine that inserts NRP energy between the combustion pulse and the pressure wave.
Figure 6B:
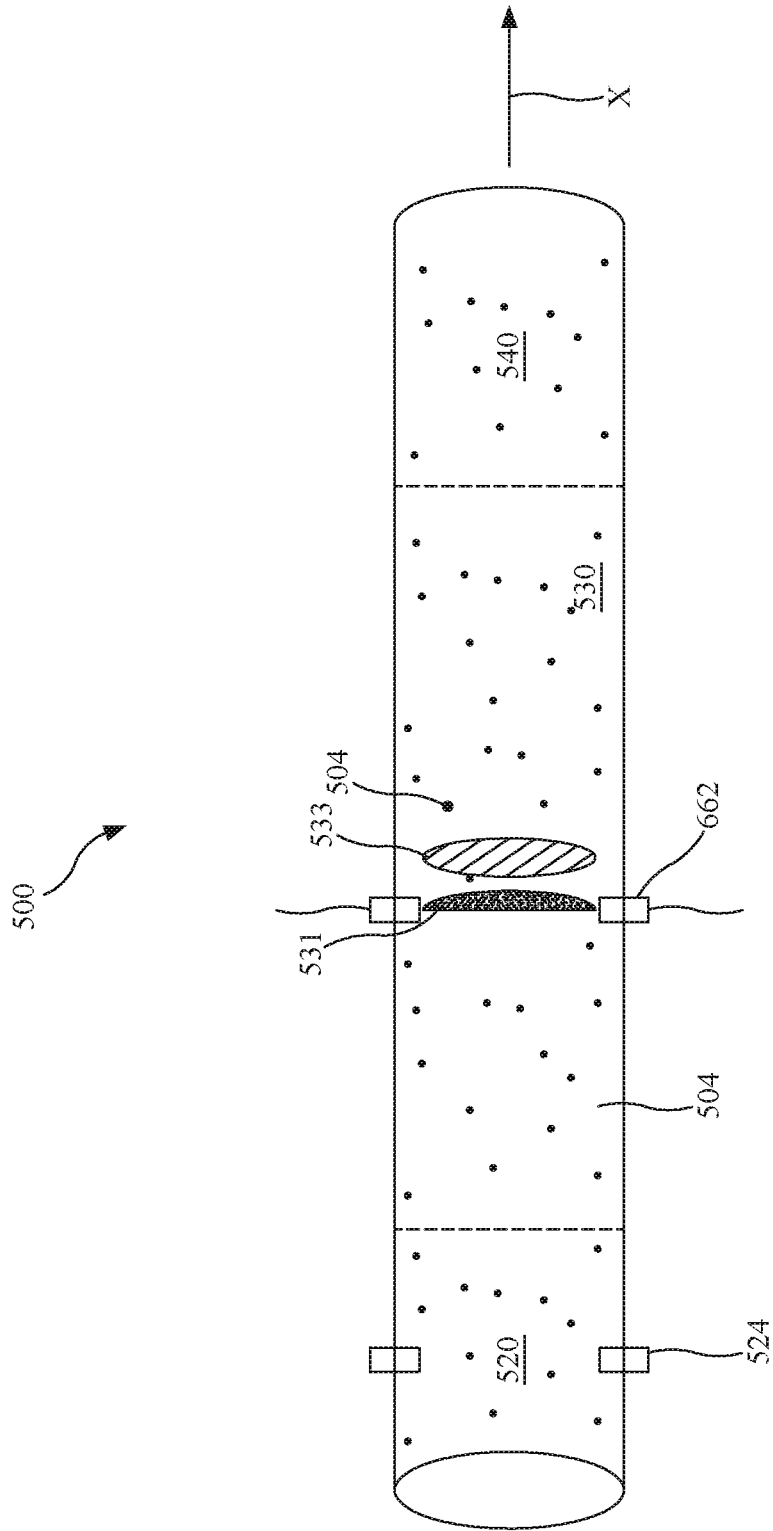
FIG. 6B illustrates an engine that inserts NRP energy in the combustion pulse.
Figure 6C:
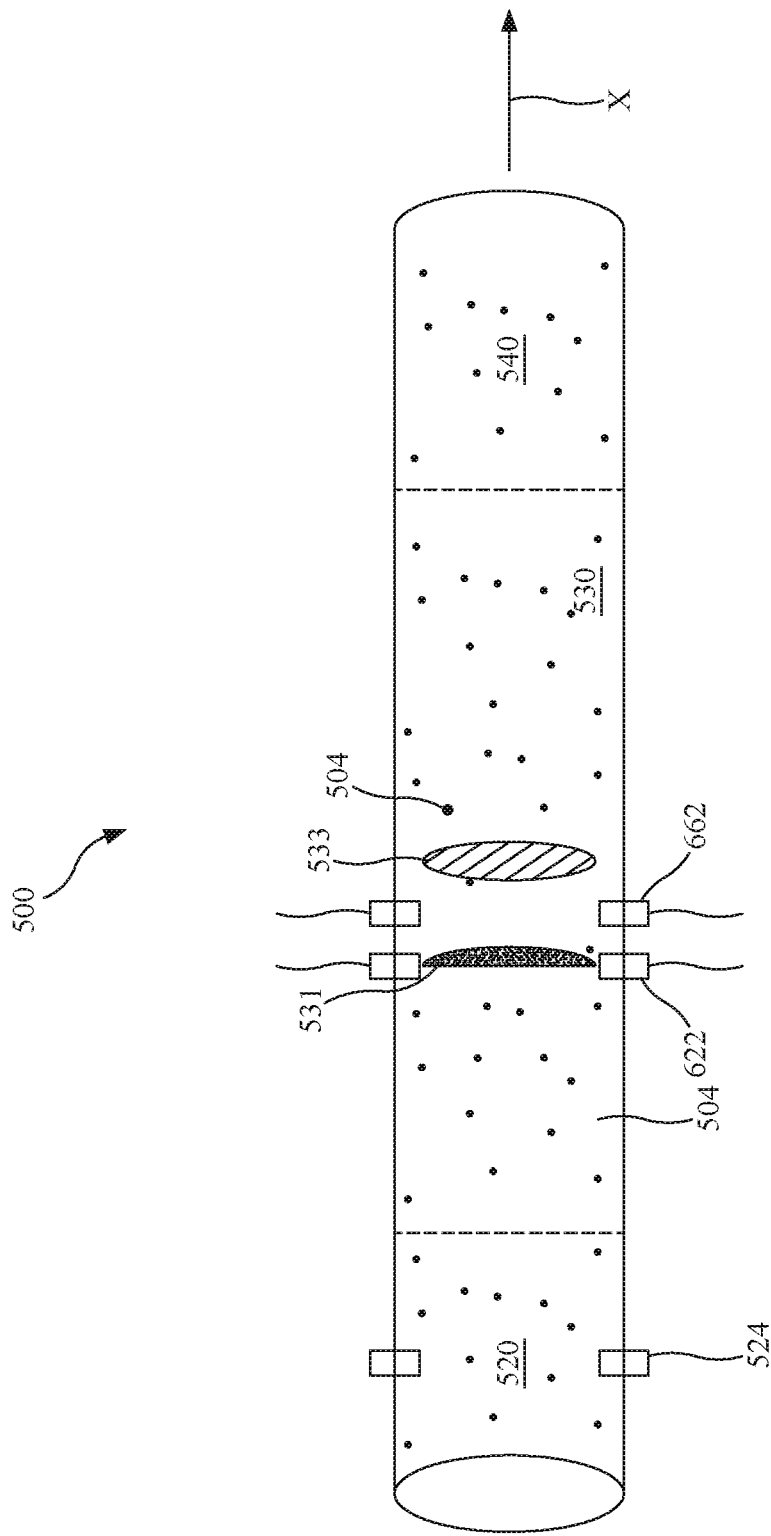
FIG. 6C illustrates an engine that inserts NRP energy between the combustion pulse and the pressure wave and into the combustion pulse.

FIG. 6A shows an embodiment in which the NRP electrodes 662 are inserting energy (plasma 538) between the combustion front 531 and the pressure wave 533, FIG. 6B shows an embodiment in which the NRP electrodes 662 are inserting the energy in the combustion front 531 and FIG. 6C shows an embodiment in which two pairs of the NRP electrodes 662 are used, one inserting energy in the combustion front 531 and one between the combustion front 531 and the pressure wave 533. Note that FIGS. 6A-6C omit the electronics that control the NRP system. The shapes of the combustion front and pressure wave in these figures are hypothetical as their actual shape evolves and changes as they propagate.

The non-thermal plasma 538 discussed above needs to be actuated at the right time for achieving the conditions noted in the embodiments of FIGS. 6A to 6C. If the high-voltage (or discharges) are applied ahead of the pressure wave and/or combustion front, local ignition of the gaseous mixture can occur, leading to a deceleration of the global combustion front. If the NRP discharges are applied after the combustion front has passed, i.e., to the burnt gases, they do not affect the propagation speed of the combustion.

To achieve the right timing for applying the NRP high-voltage, the control system 368 (see FIG. 3) is configured to switch on and off switch 366 so that the high-voltage 336 is applied at the right time and only for as long as it is effective. For example, after the combustion front has passed the NRP electrodes, there is no need to apply the high-voltage 336 until a next cycle is started in the tube. These requirements for the high-voltage 336 are now discussed with regard to FIGS. 7A-7D.

According to this embodiment, the high-voltage pulses 736 are applied by electrodes 762 in a continuous manner for a given amount of time. The characteristics of the unburnt gases (fuel mixture) are relatively well known in terms of mixture, temperature and pressure. Thus, the high-voltage 736 can be determined prior to using the engine (tube in this case) so that its amplitude is lower than the breakdown voltage for the unburnt fuel mixture. When a high-voltage is applied to a gas, if the voltage is not high enough, nothing happens in the gas, i.e., no plasma is formed and thus no current appears in the gas, between the electrodes applying the high-voltage. However, if the voltage applied by these electrodes is higher than a threshold breakdown voltage (i.e., the voltage at which the fuel mixture is ionized and a current appears through the fuel mixture reflecting that the plasma is formed), the fuel mixture breaks down into positive and negative charges and a current flows between the electrodes creating the plasma 738. The threshold breakdown voltage for a specific gas (e.g., a specific fuel mixture at specific pressure and temperature) is known. Thus, the control system 768 can include a processor 770 and a memory 772 that stores these values. When a certain fuel mixture at certain pressure and temperature is selected for the tube 700, the processor 770 may be instructed, through an input/output interface 774, by the operator of the engine, which fuel mixture is going to be used. Pressure and temperature in the engine can be either known from characterization of the engine or measured by sensors or any diagnostics. Processor 770 then selects the correct threshold breakdown voltage for the selected fuel mixture, and instructs the pulser 764 to apply a voltage having an amplitude less than the threshold breakdown voltage.

This voltage less than the threshold breakdown voltage (applied voltage 736 herein) is then applied continuously (in the sense of plural pulses as illustrated in FIG. 4) before the combustion front is arriving at the electrodes 762. Note that for an engine that operates based on cycle of pulses, the ignition time for each cycle is known and the propagation time of the flame due to the ignited fuel mixture, from the ignition region 720 to the location of the electrodes 762, is also approximately known. Thus, the processor 770 instructs the pulser 764 to apply the high-voltage 736 before the combustion flame arrives at the location of the electrodes 762 based on these known times. In one embodiment, it is possible to estimate in the processor 770 the arrival time of the combustion flame 731 at the location of the electrodes 762 and to apply the high-voltage 736 at a time T1 before the calculated arrival time. In one embodiment, a time interval between the time T1 and the calculated arrival time may be in the nanoseconds to hundreds of milliseconds range.

Applying the high-voltage 736 before the combustion front arrives at the electrodes 762 does not negatively impact the fuel mixture 704 present between the electrodes (see FIG. 7A) because this applied voltage is below the threshold breakdown voltage discussed above. Thus, although the combustion front 731 is still away from the electrodes 762, the high-voltage 736 is "on" without affecting the fuel mixture and there is no energy loss or negative impact on the propagation of the combustion front.

When the combustion front 731 (still in the deflagration mode) approaches the electrodes 762, as illustrated in FIG. 7B, fluctuations in the pressure, temperature and gas resistivity between the electrodes 762 occur, making the medium between the electrodes to have a lower threshold electrical breakdown voltage. This lower threshold electrical breakdown voltage becomes higher than the applied voltage 736, which means that a current is formed between the electrodes, a plasma 738 is generated and thus, the medium between the electrodes breaks down. This happens just before the combustion front 731 has reached the location of the electrodes 762.

As illustrated in FIG. 7B, the plasma 738 is applied between the combustion front 731 and the pressure wave 733 or it may happen while the combustion front 731 is just passing the electrodes. This sudden discharge of NRP energy from the plasma into the combustion front and/or between the combustion front and the pressure wave determine the DDT region 730 to end and the detonation region 740 to appear, as illustrated in FIG. 7C. The applied voltage 736, which is a repetition rate of the high-voltage pulses as illustrated in FIG. 4, has to be fast enough, compared to the propagation of the combustion front 731, to have several voltage discharges in the combustion front, to maximize an energy deposited in the combustion front and not to apply the energy in the burnt gases behind the combustion front. For this reason, each of the high-voltage pulses lasts between 1 ns and 500 ns, so that plural pulses are applied to the combustion front 731 while passing the electrodes 762. The repetition rate of these NRP discharges may be in the range from 30 kHz to 100 MHz.

After the combustion front 731 has passed electrodes 762, as illustrated in FIG. 7D, if the applied voltage 736 is still on, it does not contribute with anything to the engine, except for wasting energy. Thus, a measurement unit 780 is installed on one or more of the lines carrying the voltage pulses for performing current and/or voltage measurements. The measurements are provided to processor 770, which analyses their values. It is known that after the combustion front 731 has passed, the burnt gases 790 left behind behave in a certain way when the predetermined voltage is applied. For example, the current picks are in the range of 1 to 200 Amps. After a predetermined number of these identified currents picks, for example from 1 to 100 depending on the operating conditions, processor 770 opens the switch 766 so that no more high-voltages are applied to the inside of the tube 700. In one application, processor 770, may also instruct pulser 764 to stop generating the high-voltage pulses. Processor 770 will close the switch 766 when the next cycle of the engine is started. As discussed above, the timing of the next cycle in the engine is known. The processes discussed above with regard to FIGS. 7A-7D are repeated for as long as a new cycle of the engine is generated.

In one application, processor 770 may not use the measurements from measurement unit 780 for determining when to switch off the switch 766. For this application, the processor 770 may be instructed to switch off the switch 766 after a predetermined number of high-voltage pulses are applied to the electrodes. For example, the predetermined number of pulses may be 100. Other values for this number may be used depending on the type of engine, its characteristics and its type of fuel.

The location of electrodes 762 relative to the ignitor 724, which is located in the ignition zone 720, varies, depending on the geometry of the detonation engine. For example, this distance D (see FIG. 7D) may be between 1 cm to 2 m.

Figure 8:
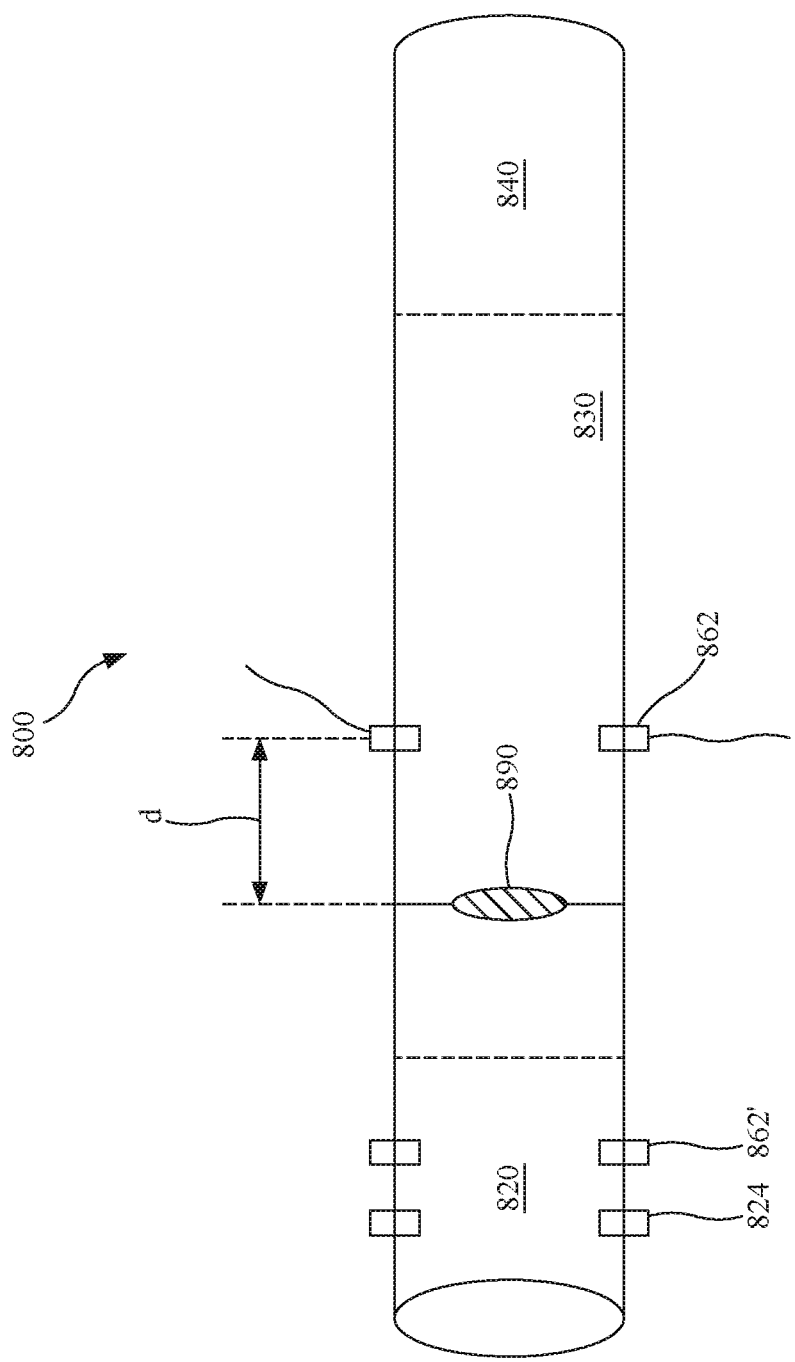
FIG. 8 illustrates the engine of FIGS. 7A-7D and having an obstacle.

Another factor that may reduce the DDT time is related to the placement of an obstacle inside the tube, just before or at the location of electrodes 762. This concept is illustrated in FIG. 8, where an obstacle 890 is placed inside tube 800, just before electrodes 862, in the DDT region 830. A distance d along the longitudinal axis X of the tube, between the electrodes 862 and obstacle 890, may be between zero and 20 cm. Obstacle 890, when placed before electrodes 862, produce a disturbance in the propagation of the combustion front, which is likely to enhance the detonation process. Note that obstruction 890 only partially occupies a cross-section of the tube so that the fuel mixture and the combustion flame can pass past the obstruction.

The following experiments were conducted within a tube for determining the DDT region characteristics of traditional methods and the novel embodiments discussed above. The first setup used a fuel mixture of $H_2$-air at stoichiometry with an initial pressure of 1 bar. The fuel mixture was ignited with a spark at one end of the tube. No obstacle was present in the tube. The second setup used the same conditions as in the first setup, but an obstacle was located in the middle of the tube. This setup had a blockage ratio of 43%, which is an optimized value based on literature examples. The third setup used the same conditions as in the first setup, no obstacle, but an NRP system (as described in FIG. 3) was located at the middle of the tube along the longitudinal axis. The NRP system included a pair of pin-to-pin stainless steel electrodes, with a gap distance of 36 mm, and a radius of curvature of the tip of about 200 μm. These electrodes were located 1.3 m downstream from the ignition source. The amplitude of the high-voltage pulses was 20 kV and the pulses were applied with a repetition of 30 kHz.

Figure 10:
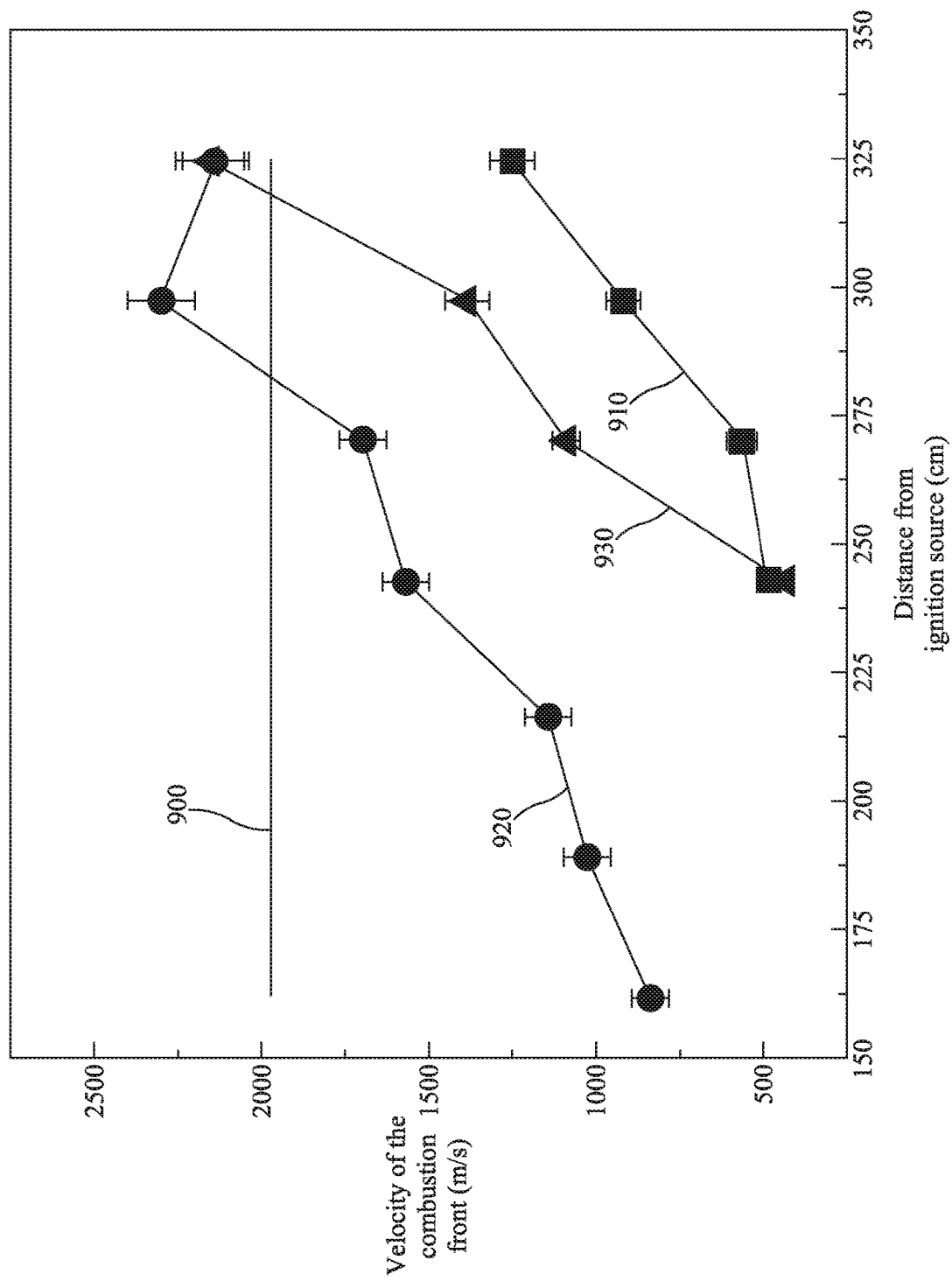
FIG. 10 compares the speed of the combustion front for traditional engines and the engine shown in FIG. 3.

The evolution of the combustion front's speed for these three setups is shown in FIG. 10. It can be seen that for the first setup, the corresponding speed 910 (the squares in the figure) does not reach the detonation speed 900, and thus no detonation is achieved. For the second setup, the corresponding speed 920 (the circles in the figure) reaches the detonation speed 900 about 300 cm away from the location of the ignition source. Thus, detonation is achieved for this setup.

For the third setup, the corresponding speed 930 (the triangles in the figure) also reaches the detonation speed 900 about 327 cm away from the ignition source. Detonation is also achieved with this setup.

In one embodiment, also illustrated in FIG. 8, it is possible to add a second NRP system that includes electrodes 862', in the ignition region 820, for reducing the ignition time.

The geometry as well as the number of NRP electrodes in the DDT region can vary significantly. For example, FIG. 6A showed an embodiment using a single pair of electrodes while the embodiment of FIG. 6C showed an embodiment using two pairs of electrodes. In one application, it is possible to use up to 20 pairs, separated by distances in the range of 2 mm to 20 cm. The electrodes 762 can be, for example, in pin-to-pin, pin-to-ring, ring-to-ring, pin-to-plane, or plane-to-plane geometry.

Figure 9A:
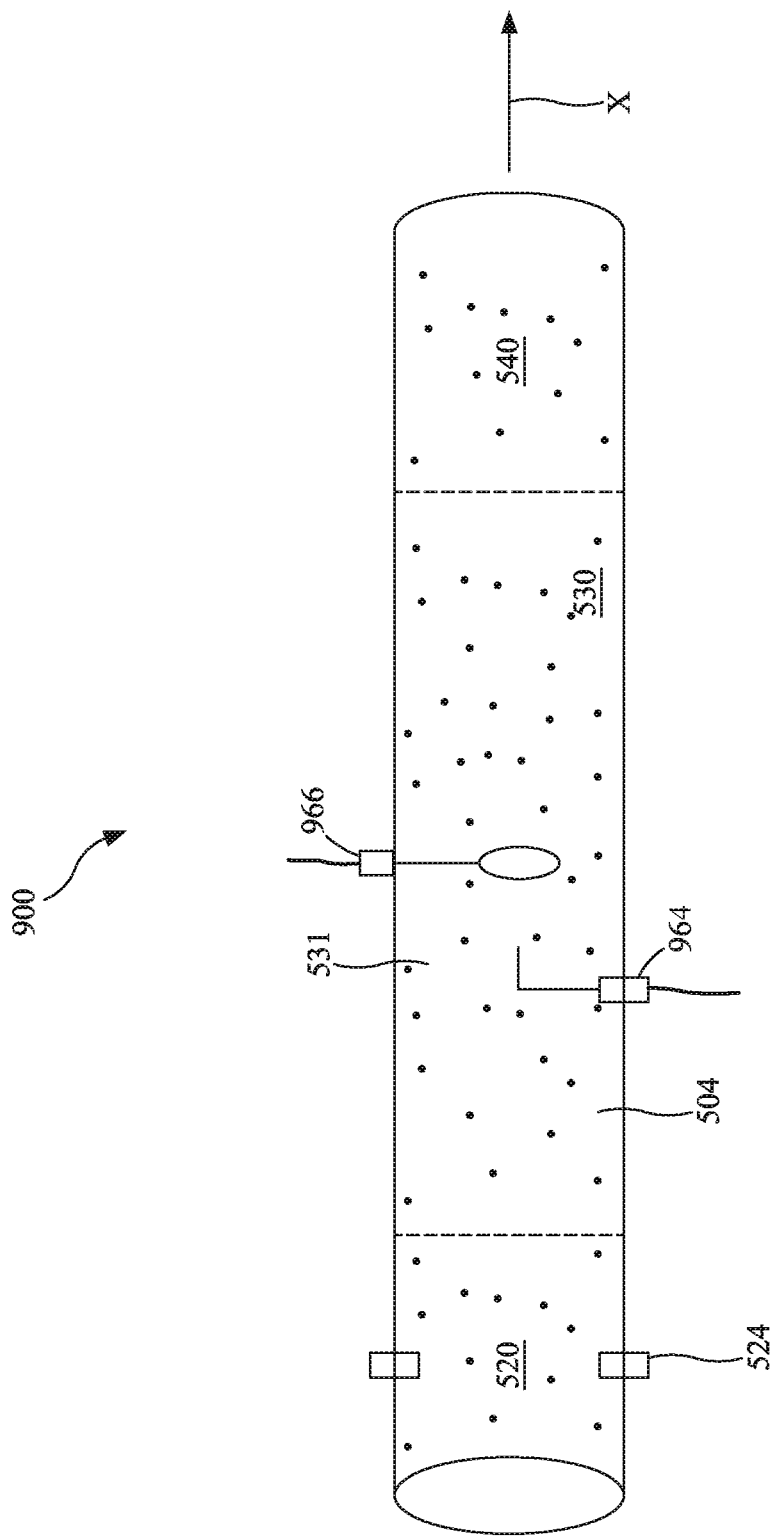
FIG. 9A illustrated an engine that inserts NRP energy with a pin-to-ring configuration into the combustion pulse.
Figure 9B:
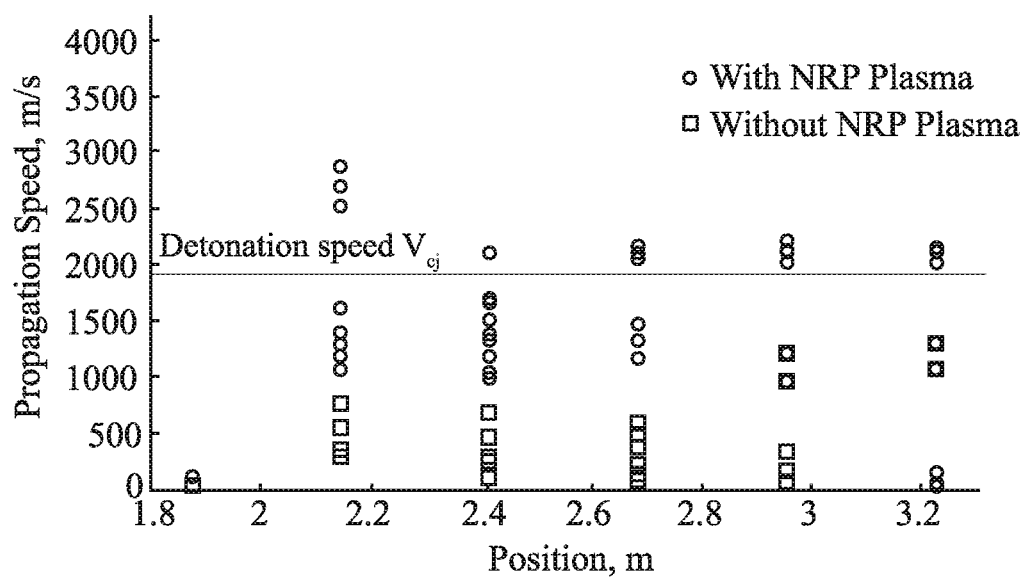
FIG. 9B illustrates the propagation speed of the detonation for various cases.

For example, experiments were conducted with a pin-to-ring configuration of the electrode as shown in FIG. 9A. The pin electrode 964 was centered inside the detonation tube 900, while a coaxial stainless-steel ring 966, e.g., of 18 mm diameter, was used as an anode. With this arrangement, and for high voltage pulses of 10 ns, 24.5 kV amplitude and a repetition rate of 100 kHz, the transition to detonation was systematically obtained (over a panel of 100 tests), while no detonation was observed without plasma actuation. These experiments were carried out in a detonation tube filled with $H_2$-air mixture at a pressure of 1 bar. Results obtained for no plasma actuation (squares in FIG. 9B) and plasma actuation (circles in FIG. 9B) show that no deflagration to detonation transition was obtained for the first case while an auto-driven mechanism is observed for the second case (note the detonation appearing at about 2.95 m from the ignition source in the second case).

Depending on the detonation engine geometry, the inter-electrode gap distance can vary from 5 mm to 100 mm. The material of the electrodes can be any conductive material that can support thermal and pressure conditions generated by a detonation. For example, the electrodes can be made of stainless steel, tungsten, or iron alloy.

The high-voltage pulses (see for example FIG. 4) used for the NRP system 360 can be generated, for example, by existing commercial power supplies (for example, from the company FID technologies, GmBH, or from the company EagleHarbor Technology) or lab-made. The duration of each high-voltage pulse should be in the range of 1 ns to 500 ns, and their amplitude should be in the range of 5 kV to 50 kV, depending on the fuel mixture used. When breakdown occurs, the energy of each plasma pulses may be in the range of 0.5 mJ up to 100 mJ. Other values may also be used. The shape of the voltage pulses can be of any sort, rectangular, triangular, or any arbitrary shape. The plasma pulses would have a stronger effect on the combustion front propagation when the pulse repetition frequency is in the range of 30 kHz to 100 MHz.

As discussed above with regard to FIGS. 7A-7D, the control of voltage and current is used to control the triggering of the plasma actuation and the energy deposition into the engine. They can be realized by current and voltage measurements, or by any other measurements systems able to assess characteristics of the electrical breakdown, e.g., pressure sensor, optical sensor, thermal sensor. The voltage control and number of pulses as well as the synchronization with the engine cycles are realized by a control loop that can be integrated into the control system 368 of the engine, or added to the engine in a specific electronic device. The loop is auto-driven as the processor determine when to apply the NRP voltage, based on the cycle information of the engine, and when to suppress the NRP voltage, as discussed with regard to FIG. 7D, and these times are auto-adjusted depending on the propagation speed of the deflagration, which is difficult to predict accurately.

A comparison of the configuration illustrated in FIG. 3 with existing technologies is now provided. The two most common ways to decrease the distance (or duration) of DDT are: 1) by increasing the ignition energy, and 2) by adding obstacles or changes in the geometry of the tube that will enhance the turbulence of the combustion front. Alternatively, these obstacles may be replaced by thermal electrical discharges, which can create shock waves and thermal enhancement of the turbulence.

The main drawbacks of an elevated energy deposition during ignition (the first traditional way) are: i) the deposited ignition energy affects the yield of the engine. In extreme cases, to reach the onset of a detonation, the ignition energy necessary is comparable to the thermal energy released by the detonation; and ii) a strong energy deposition is associated with strong heating and damages of the surfaces (thermal erosion). The embodiments discussed above do not have these problems because they work with standard ignition systems (for example, from commercial spark ignition engines) and the energy deposited by the non-thermal plasma actuation to obtain a detonation is significantly less than the increase in ignition energy that would lead to a same effect on the DDT.

In addition, due to the ultra-short duration of the high-voltage pulses (see FIG. 4), the above discussed embodiments do not produce thermal plasmas, such as arcs. Consequently, the thermal heating of the engine when using the above embodiments is not significant enough to damage the electrodes or other parts of the engine.

The main drawbacks of the obstacle and/or geometry strategies, associated with the second traditional way, to reach the onset of a detonation are: i) they are permanent and adapted to a specific regime of the detonation engine. If the fuel, the load, or the temperature are changed, they may significantly lose their efficiency; and ii) they impact the global geometry of the engine, irrespective of the yield optimization of the system. In the case of actuation by arc discharges, the energy required is significantly higher compared to the energy released by the detonation, and the problem of electrode erosion is the same as for elevated ignition energy. The above discussed embodiments have a minimal impact on the design of the internal structure of the detonation chamber. The electrodes of the NRP system 360 in FIG. 3 can be as small as two pins with diameters of a few millimeters. Therefore, optimized design of the detonation engine can be achieved with the above discussed embodiments.

Figure 11:
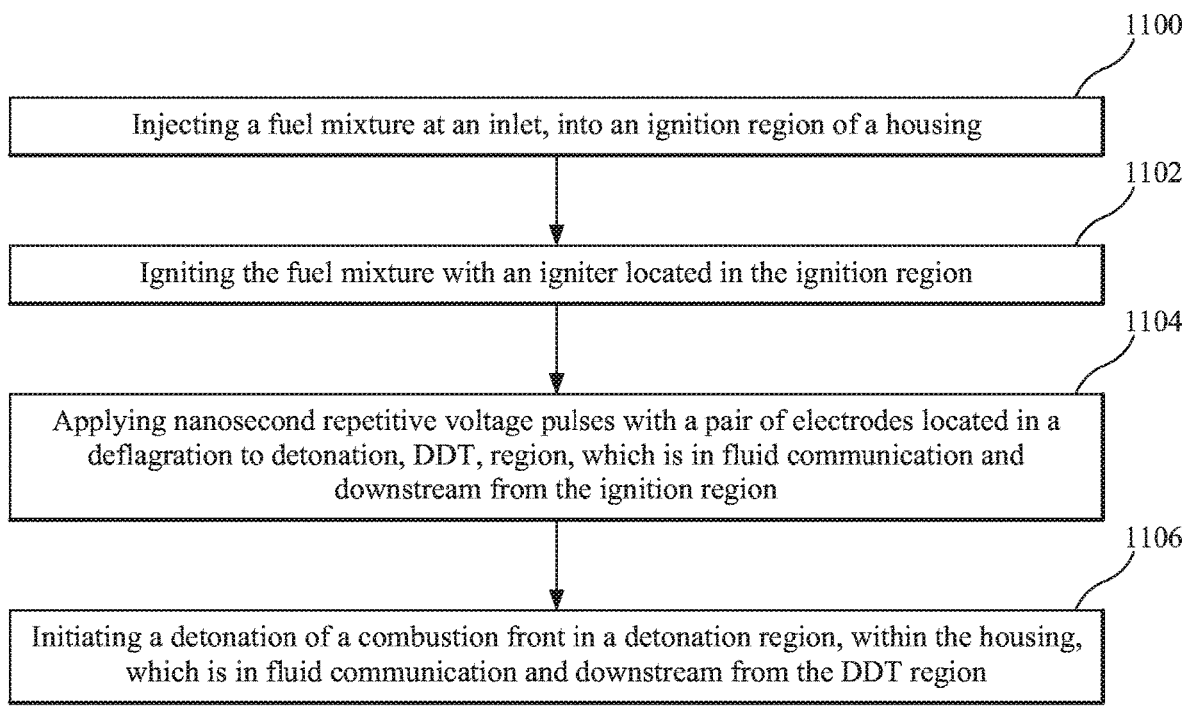
FIG. 11 is a flowchart of a method for applying NRP energy into a combustion front.

According to an embodiment, illustrated in FIG. 11, a method for driving an engine that uses detonation for generating energy is discussed. The method includes a step 1100 of injecting a fuel mixture at an inlet, into an ignition region of a housing, a step 1102 of igniting the fuel mixture with an ignitor located in the ignition region, a step 1104 of applying nanosecond repetitive voltage pulses with a pair of electrodes located in a deflagration to detonation, DDT, region, which is in fluid communication and downstream from the ignition region, and a step 1106 of initiating a detonation of a combustion front in a detonation region, within the housing, which is in fluid communication and downstream from the DDT region. The nanosecond repetitive voltage pulses generate a non-thermal plasma that initiate a transition of the combustion front propagation through the housing from a deflagration mode to a detonation mode.

In the method, the nanosecond repetitive voltage pulses are applied into the combustion front, or the nanosecond repetitive voltage pulses are applied between the combustion front and a pressure wave that moves ahead of the combustion front, or both. In one application, the combustion front has a subsonic speed in the DDT region and a sonic speed, with respect to the burnt gases, in the detonation region.

The method may further include a step of generating with a pulser the nanosecond repetitive voltage pulses, and controlling with a control system the pulser and the pair of electrodes to turn on the pair of electrodes before the combustion front arrives at a location of the pair of electrodes. Optionally, the method may include instructing the pulser to generate the nanosecond repetitive voltage pulses with an amplitude smaller than a threshold breakdown voltage of the fuel mixture, and/or receiving current or voltage measurements indicative of a volume between the pair of electrodes, and based on the measurements, determining to switch off the nanosecond repetitive voltage pulses applied by the pair of electrodes. In another application, the method may include switching off the nanosecond repetitive voltage pulses applied by the pair of electrodes after a predetermined number of discharges.

In another embodiment, there is an auto-driven plasma actuator control system (e.g., system 360), that includes a pulser configured to generate nanosecond repetitive voltage pulses, a pair of electrodes to be located in a deflagration to detonation, DDT, region of an engine, and configured to apply nanosecond repetitive voltage pulses to the DDT region, and a control system configured to control the pulser and the pair of electrodes. The control system turns on the pair of electrodes before a combustion front of the engine arrives at a location of the pair of electrodes and turns the pair of electrodes off after the combustion front has passed, and the nanosecond repetitive voltage pulses generate a non-thermal plasma that transition the combustion front propagation through the engine from a deflagration mode to a detonation mode.

The disclosed exemplary embodiments provide methods and systems for accelerating a deflagration to detonation transition in an engine. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

Lacoste, D. A., Moeck, J. P., Durox, D., Laux, C. O., and Schuller, T. 2013. Effect of nanosecond repetitively pulsed discharges on the dynamics of a swirl-stabilized lean premixed flame. *J. Engineer. Gas Turbines Power*, 135, 101501.

Lefkowitz, J. K., Guo, P., Ombrello, T., Won, S. H., Stevens, C. A., Hoke, J. L., Schauer, F., Ju, Y. 2015. Schlieren imaging and pulsed detonation engine testing of ignition by nanosecond repetitively pulsed discharge. *Combust. Flame*, 162(6), 2496-2507.

Pilla, G., Galley, D., Lacoste, D. A., Lacas, F., Veynante, D., and Laux, C. O. 2006. Stabilization of a turbulent premixed flame using a nanosecond repetitively pulsed plasma. *IEEE Trans. Plasma Sci.*, 34(6), 2471.

Pilla, G., Lacoste, D. A., Veynante, D., and Laux, C. O. 2008. Stabilization of a swirled propane-air flame using a nanosecond repetitively pulsed plasma. *IEEE Trans. Plasma Sci.*, 36(4), 940.

Yin, Z., Takashima, K., and Adamovich, I. V. 2011. Ignition time measurements in repetitive nanosecond pulse hydrogen-air plasmas at elevated initial temperatures. *IEEE Trans. Plasma Sci.*, 39(12), 3269.

What is claimed is:

1. An engine that uses detonation for generating energy, the engine comprising:
    a housing;
    an inlet configured to inject a fuel mixture into an ignition region of the housing, the inlet being attached to the housing;
    an ignitor located in the ignition region and configured to ignite the fuel mixture;
    a deflagration to detonation, DDT, region in fluid communication and downstream from the ignition region;
    a pair of electrodes located in the DDT region and configured to apply nanosecond repetitive voltage pulses with an amplitude smaller than a threshold breakdown voltage of the fuel mixture to the ignited fuel mixture in the DDT region; and
    a detonation region, within the housing, in fluid communication and downstream from the DDT region, wherein the nanosecond repetitive voltage pulses generate a non-thermal plasma that transition a combustion front propagation, of the ignited fuel mixture, through the housing, from a deflagration mode to a detonation mode, wherein a pressure wave moves ahead of the combustion front in the DDT region, and wherein the nanosecond repetitive voltage pulses are applied between the combustion front and the pressure wave or are applied into the combustion front itself.

2. The engine of claim 1, wherein the combustion front has a subsonic speed in the DDT region and a sonic speed, with respect to the burnt gases, in the detonation region.

3. The engine of claim 1, wherein the engine is a gas turbine.

4. The engine of claim 1, further comprising:
    a pulser configured to generate the nanosecond repetitive voltage pulses; and
    a control system configured to control the pulser and the pair of electrodes.

5. The engine of claim 4, wherein the control system includes a processor and a memory, and the processor is configured to turn on the pair of electrodes before the combustion front arrives at a location of the pair of electrodes.

6. The engine of claim 5, wherein the processor instructs the pulser to generate the nanosecond repetitive voltage pulses.

7. The engine of claim 6, wherein the processor receives current or voltage measurements indicative of a volume between the electrodes and based on the measurements, determines to switch off the nanosecond repetitive voltage pulses applied by the pair of electrodes.

8. The engine of claim 6, wherein the processor is configured to switch off the nanosecond repetitive voltage pulses applied by the pair of electrodes after a predetermined number of discharges.

9. A method for driving an engine that uses detonation for generating energy, the method comprising:
    injecting a fuel mixture at an inlet, into an ignition region of a housing;
    igniting the fuel mixture with an ignitor located in the ignition region;
    applying nanosecond repetitive voltage pulses with an amplitude smaller than a threshold breakdown voltage of the fuel mixture to the ignited fuel mixture, with a pair of electrodes located in a deflagration to detonation, DDT, region, which is in fluid communication and downstream from the ignition region; and
    initiating a detonation of a combustion front in a detonation region, within the housing, which is in fluid communication and downstream from the DDT region, wherein the nanosecond repetitive voltage pulses generate a non-thermal plasma that initiate a transition of the combustion front propagation, of the ignited fuel mixture, through the housing from a deflagration mode to a detonation mode, wherein a pressure wave moves ahead of the combustion front in the DDT region, and wherein the nanosecond repetitive voltage pulses are applied between the combustion front and the pressure wave or are applied into the combustion front itself.

10. The method of claim 9, wherein the combustion front has a subsonic speed in the DDT region and a sonic speed, with respect to the burnt gases, in the detonation region.

11. The method of claim 9, further comprising:
    generating with a pulser the nanosecond repetitive voltage pulses; and controlling with a control system the pulser and the pair of electrodes to turn on the pair of electrodes before the combustion front arrives at a location of the pair of electrodes.

12. The method of claim 11, further comprising:
instructing the pulser to generate the nanosecond repetitive voltage pulses with the amplitude smaller than the threshold breakdown voltage of the fuel mixture for a selected pressure and temperature of the gas.

13. The method of claim 12, further comprising:
receiving current or voltage measurements indicative of a volume between the pair of electrodes; and
based on the measurements, determining to switch off the nanosecond repetitive voltage pulses applied by the pair of electrodes.

14. The method of claim 12, further comprising:
switching off the nanosecond repetitive voltage pulses applied by the pair of electrodes after a predetermined number of discharges.

15. An auto-driven plasma actuator control system comprising:
a pulser configured to generate nanosecond repetitive voltage pulses;
a pair of electrodes to be located in a deflagration to detonation, DDT, region of an engine, and configured to apply nanosecond repetitive voltage pulses having an amplitude smaller than a threshold breakdown voltage of a fuel mixture to the DDT region; and
a control system configured to control the pulser and the pair of electrodes,
wherein the control system turns on the pair of electrodes before a combustion front of an ignited fuel mixture of the engine arrives at a location of the pair of electrodes and turns the pair of electrodes off after the combustion front has passed, and
wherein the nanosecond repetitive voltage pulses generate a non-thermal plasma that transitions the combustion front propagation, of the ignited fuel mixture, through the engine from a deflagration mode to a detonation mode, wherein a pressure wave moves ahead of the combustion front in the DDT region, and wherein the nanosecond repetitive voltage pulses are applied between the combustion front and the pressure wave or are applied into the combustion front itself.

* * * * *